Nov. 15, 1932.  J. BERGE  1,887,616
FASTENER
Filed June 20, 1930

INVENTOR.
Joseph Berge,
BY Buell, Dunn & Anderson
ATTORNEYS.

Patented Nov. 15, 1932

1,887,616

UNITED STATES PATENT OFFICE

JOSEPH BERGE, OF MONTCLAIR, NEW JERSEY

FASTENER

Application filed June 20, 1930. Serial No. 462,451.

This invention relates to fasteners, and more particularly to those fasteners requiring means for preventing their loosening, having in mind machine screws, wood screws, bolts and nuts.

One object of my invention is to provide as an integral part of the head of a fastener, a spur that will slip over the surface adjacent the face of the fastener as the latter is tightened, but which will tend to engage the surface when the fastener is reversed.

Another object of my invention is to eliminate lock washers,—separate units generally inserted under the head of fasteners of this type.

Another object of my invention is to speed up the assembly of devices requiring fasteners so safeguarded, it being apparent that a fastener with the locking spur as a part can be handled with greater ease than when accompanied by a separate lock washer.

Another object is to reduce the cost of manufacture of articles requiring fasteners of this type.

In accordance with the present invention, the head of the fastener is provided with a slot preferably in its side deep enough and at an angle so as to permit deforming or displacing the acute angled portion so that its feather edge projects beyond the plane of contact with the surface against which the head butts.

A better understanding of the invention may be had from the following description together with the accompanying drawing, wherein.

Figure 1:
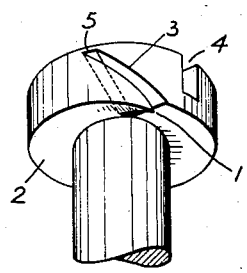
Fig. 1 is a perspective of an ordinary fillister head screw of a conventional cylindrical shape showing the regular screw driver slot and the deformed projector after slotting the cylindrical wall.

In the drawing, the numeral 1 illustrates the biting tooth or spur that has been displaced away from the contact surface or plane 2. The manner of cutting this slot is immaterial, but I find at present the most economical method is to saw the slots 3 at the same time, that is, in the same setting as made for the screw driver slots 4 which are sawed in rapid automatic machines. The depth of the slot 3 depends on the type of head but let it suffice to say a greater depth gives spring to the tooth so that it functions as its own spring insuring contact, should the fastener shake loose or stretch.

Figure 2:
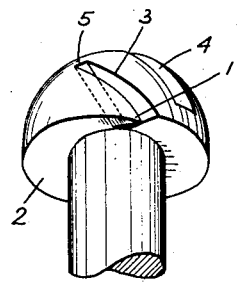
Fig. 2 shows a round head or button head screw likewise provided with the spur.
Figure 3:
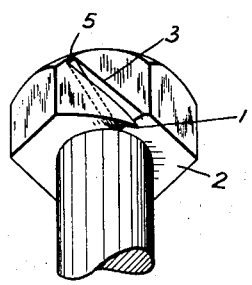
Figs. 3 and 4 shows a hexagonal head bolt and nut respectively incorporating the invention.
Figure 4:
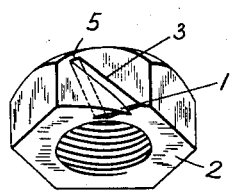
Figure 5:
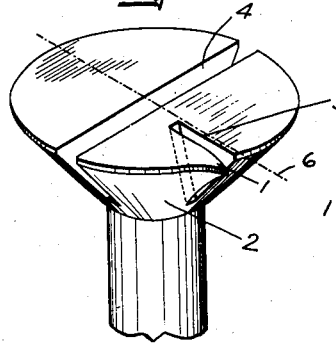
Fig. 5 shows a flat head countersunk type screw head also provided with the spur.
Figure 8:
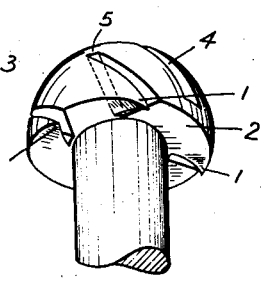
Fig. 8 shows an embodiment having a plurality of slots and consequent teeth or lips.
Figure 9:
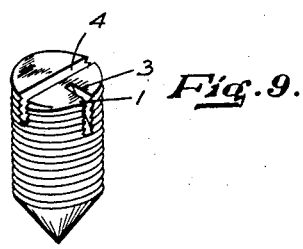
Fig. 9 shows a headless type set screw embodying the invention.

I find, to avoid weakening, the nut (Fig. 4) preferably has the bottom of the slot 3 cut almost to the thread diameter on the bottom side 2 and so tilted that it does not penetrate the diameter on the top 5. This may also be carried out in the embodiments shown in Figs. 1, 2 and 3. In Fig. 5 the slot 3 has also been shown at one side of the center line 6 intersecting the screw driver slot at right angles. In Fig. 9 I show the slot cut directly into the thread of a headless set screw and the lip is made from the thread portion itself. While I show all of these for right hand application, they may be as readily made the opposite hand for left hand threads.

Figures 6, 7:
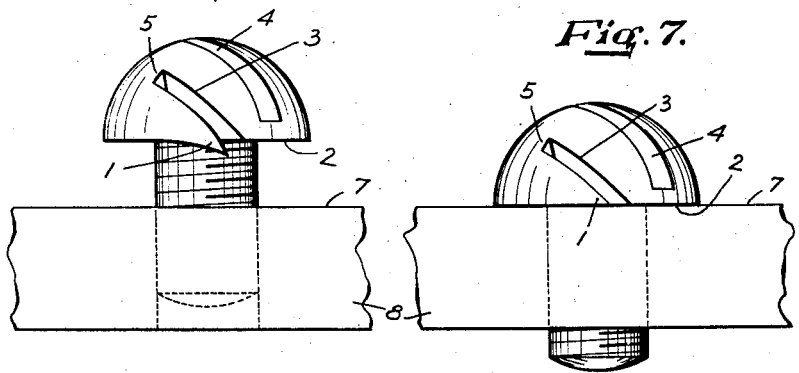
Figs. 6 and 7 show a screw incorporating the invention, before and after it has been driven home.

The operation of the invention may be readily ascertained by reference to Figs. 6 and 7. Fig. 6 shows a fastener or screw which has been partly screwed into th ele- ment 8. The bearing surface 2 of the screw has as yet not come into contact with the surface 7. It may be noted that in this position the protrusion 1 extends appreciably below the bearing plane 2.

Fig. 7 shows the fastener screwed home into the element 8, the surfaces 2 and 7 of the fasteners and the element 8 respectively being tightly wedged together. It is to be noted that the slot 5 inclines upwardly in the direction of tightening the screw, in consequence of which the protrusion 1 has little or no effect in preventing the fastener from being tightened. However, if an attempt is made to loosen the fastener, the protrusion 1 digs into the surface 7, thereby preventing relative movement between the various surfaces.

It is clear that if the fastener is softer than the surface 7 into which the tooth 1 is expected to dig, the tooth will simply return to its original position without functioning. To prevent this I provide hard material or harden the entire fastener, head and all, so that the fastener will be harder than the surface with which it will have contact. I may even harden the head alone but as this would prove more costly, I prefer to harden the entire fastener. This may be accomplished by any of the well known methods such as carbonizing, case hardening, the cyanide of potassium method, or by the use of oil or water quench tempering, or any other method.

It is to be understood that the embodiments disclosed herein are merely by way of illustration, and that the invention may be applied to numerous fastening elements, all of which are to be considered within the purview of this invention.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A fastener of the type adapted to bear against a surface in service, having a slot of substantially triangular configuration bounded on one side by a sharp pointed protrusion adapted to engage said surface and prevent relative movement between said fastener and said surface in the direction of loosening said fastener.

2. A threaded fastener having on its depth-limiting surface a sharp protrusion adapted to dig into its adjacent bearing surface when turned in one direction, the said protrusion tapering to a point from the base of a slot cut in said fastener.

3. A fastener of the type adapted to bear against a surface in service, having a plurality of hardened protrusions preventing relative movement between said fastener and said surface in the direction of loosening said fastener, the said protrusions each tapering to a point from the base of slots cut in said fastener.

4. A screw fastener of the type adapted to bear against a surface in service, a slot of substantially triangular configuration in said fastener inclined upwardly from its bearing face in the direction of tightening said screw, one edge of said slot protruding beyond the bearing plane and adapted to engage the adjacent bearing surface upon loosening said screw.

5. A fastener of the type adapted to bear against a surface when in locking position, having a slot of substantially uniform width and triangular configuration intersecting a bearing surface of said fastener.

6. A fastener of the type adapted to bear against a surface in service, having a slot of substantially uniform width and triangular configuration intersecting a bearing surface of said fastener and slanting upwardly in the direction of tightening said fastener.

7. A fastener of the type adapted to bear against a surface in service, having a sharp pointed protrusion formed by slotting said fastener along a fraction only of its bearing surface.

8. A fastener of the type adapted to bear against a surface in service, having a pointed protrusion of decreasing triangular cross section, said point being adapted to prevent relative rotational movement between said fastener and said surface in one direction.

9. A threaded fastener having a head portion equipped with a bearing surface and a means for preventing relative rotation between said bearing surface and the surface with which it is in contact in one direction, said means being formed by slotting the head portion of said fastener to form a protrusion tapering from the base of said slot to a point.

10. A fastener of the type adapted to bear against a surface in service, having means for preventing relative rotation in one direction between said fastener and said surface, said means being adapted to project into said surface, and formed by slotting said fastener to form a protrusion tapering to a point from the base of said slot.

In testimony whereof I affix my signature.

JOSEPH BERGE.